(12) United States Patent
Li et al.

(10) Patent No.: US 11,118,845 B2
(45) Date of Patent: Sep. 14, 2021

(54) TWO-LAYER VARIABLE-DIAMETER PACKED BED HEAT STORAGE APPARATUS AND HEAT STORAGE BALL PREPARATION METHOD

(71) Applicant: XI'AN JIAOTONG UNIVERSITY, School of Energy and Power Engineering, Xi'an (CN)

(72) Inventors: Mingjia Li, Xi'an (CN); Bo Jin, Xi'an (CN); Zhanbin Liu, Xi'an (CN); Zhao Ma, Xi'an (CN); Fan Yuan, Xi'an (CN); Yang Xu, Xi'an (CN); Mengjie Li, Xi'an (CN)

(73) Assignee: Mingjia Li, Xi'an (CN)

( * ) Notice: Subject to any disclaimer, the term of this patent is extended or adjusted under 35 U.S.C. 154(b) by 0 days.

(21) Appl. No.: 16/156,670

(22) Filed: Oct. 10, 2018

(65) Prior Publication Data
US 2019/0277575 A1    Sep. 12, 2019

(30) Foreign Application Priority Data
Mar. 7, 2018    (CN) .......................... 201810187553.0

(51) Int. Cl.
*F28D 20/02*    (2006.01)
*F28D 20/00*    (2006.01)

(52) U.S. Cl.
CPC .... *F28D 20/023* (2013.01); *F28D 2020/0069* (2013.01); *Y02E 60/14* (2013.01)

(58) Field of Classification Search
CPC ................... F28D 20/02; F28D 20/023; F28D 2020/0069; Y02E 60/145; Y02E 60/14
See application file for complete search history.

(56) References Cited

FOREIGN PATENT DOCUMENTS

| CN | 105241087 A | * | 1/2016 | |
|----|-------------|---|--------|---|
| JP | 53055547 U | * | 5/1978 | |
| JP | S5944589 A | * | 3/1984 | |
| JP | 07229690 A | * | 8/1995 | ........... F28D 20/023 |

* cited by examiner

*Primary Examiner* — Eric S Ruppert
(74) *Attorney, Agent, or Firm* — Dragon Sun Law Firm, PC; Jinggao Li, Esq.

(57) ABSTRACT

The present disclosure discloses a two-layered varied ball diameter packed bed heat storage apparatus and a method of manufacturing a heat storage ball. By arranging large-diameter heat storage balls at an upper layer of a packed bed heat storage apparatus and small-diameter heat storage balls at a lower layer thereof; the packed bed heat storage structure comprehensively considers two important evaluation indicators for a heat storage apparatus: heat storage rate and heat storage density, thereby implementing a design principle of maximizing the heat storage rate density of the packed bed heat storage apparatus; by achieving a best combination of heat storage ball diameters inside the packed bed through an optimized design, the heat storage apparatus is imparted with a best heat storage performance. The present disclosure further provides a method of manufacturing a heat storage ball.

3 Claims, 1 Drawing Sheet

TWO-LAYER VARIABLE-DIAMETER PACKED BED HEAT STORAGE APPARATUS AND HEAT STORAGE BALL PREPARATION METHOD

CROSS-REFERENCE TO RELATED APPLICATION

This application claims priority from Chinese Patent Application No. 201810187553.0, filed Mar. 7, 2018, the contents of which is incorporated herein in the entirety by reference.

FIELD

The present disclosure relates to the technical field of heat energy storage, and more particularly, to a packed bed heat storage apparatus that improves comprehensive performance of a packed bed heat reservoir, and a method of manufacturing a heat storage ball.

BACKGROUND

As a clean and pollution-free renewable energy, solar energy has advantages such as enormous reserves and wide sources; therefore, a wide array of applications and researches have been placed on solar energy utilization technologies mainly in forms of photo-electrical conversion and photothermal conversion. Among the solar energy utilization technologies, the solar energy photothermal power generation technology has attracted significant attention due to its advantages such as low environmental pollution, mature technical line, and stable electric power output. However, solar energy has issues such as intermittency and discontinuity, such that surplus energy needs to be stored using a heat storage apparatus so as to be released for utilization when necessary.

In current solar thermal power generation plants, a dual-tank heat storage system has wide commercial application. However, the dual-tank heat storage system has a high consumption of molten salts, occupies a large area, and has a high construction cost. In contrast, a single-tank heat storage system has advantages such as a simpler structure, a smaller area occupation, and a lower investment. Particularly, using phase-change heat storage balls as the heat storage material in the single-tank system may not only improve an energy storage density of a heat storage tank, but also may maintain a constant output temperature and enhance power generation efficiency of the system; therefore, this technology has attracted more and more attention in the field of solar thermal power generation.

Currently, heat storage rate (heat storage capacity per unit time) and heat storage density (heat storage capacity per unit mass) are common evaluation indicators for heat storage performance of a heat storage apparatus. However, their evaluation perspectives are limited: for a same heat storage, it always occurs that the two evaluation indicators cannot be unified, i.e., if one indicator is adopted, the other indicator has to be neglected.

Therefore, a heretofore unaddressed need exists in the art to address the aforementioned deficiencies and inadequacies.

SUMMARY

The present disclosure proposes a comprehensive indicator that comprehensively weighs the heat storage time and material mass, i.e., heat storage rate density, which means a heat storage rate per unit material mass. This indicator comprehensively weighs the two key evaluation indicators: heat storage rate and heat storage density. With the indicator as an approach of evaluating the heat storage performance of a heat storage apparatus, when the heat storage rate density is the highest, the overall heat storage performance of the heat storage apparatus is the best.

An objective of the present disclosure is to provide a packed bed heat storage apparatus and a method of manufacturing a heat storage ball, which may impart a best heat storage performance to a heat reservoir under a designing principle of maximizing a heat storage rate density of the packed bed heat storage apparatus, thereby implementing sealing of a phase-change heat storage material.

To achieve the above objective, the packed bed heat storage apparatus according to the present disclosure includes: a heat storage tank having a fluid inlet channel opened at an upper end of the heat storage tank and a fluid outlet channel at a lower end, respectively; two layers of heat storage balls with different diameters provided inside the heat storage tank, i.e., at a position of the packed bed, wherein the diameter of the heat storage balls at the upper layer is greater than that of the heat storage balls at the lower layer; and a top flow equalization distributor in communication with the fluid inlet channel to equalize the inlet flow and a bottom flow equalization distributor in communication with the fluid outlet channel to equalize the outlet flow, which are provided external to the two layers of heat storage balls.

The heat storage tank includes a cylindrical heat storage tank, and a top conical heat storage tank mounted at an upper end of the cylindrical heat storage tank and a bottom conical heat storage tank mounted at a lower end of the cylindrical heat storage tank.

The fluid inlet channel is opened at the top conical heat storage tank, and the fluid outlet channel is opened at the bottom conical heat storage tank.

The top flow equalization distributor is mounted at the upper end of the cylindrical heat storage tank and the bottom flow equalization distributor is mounted at the lower end of the cylindrical heat storage tank.

A metal support supporting the heat storage balls is provided at an interface between the cylindrical heat storage tank and the bottom conical heat storage tank.

The heat storage tank and the heat storage balls are made of a stainless metal, the heat storage balls being packed with a low-temperature organic phase-change material, an organic salt or a high-temperature molten salt phase-change material.

During a heat exchange process, the upper layer of the two-layered varied ball diameter heat storage apparatus has a relatively high temperature, while the lower layer thereof has a relatively lower temperature; by adopting heat storage balls with a relatively large diameter at the upper layer, the amount of heat storage materials in use is increased such that the heat storage density of the heat reservoir is raised; by adopting heat storage balls with a relatively small diameter at the lower layer, a contact area between a heat exchanging fluid and the heat storage balls is increased to thereby raise the heat storage rate of the heat reservoir.

A method of manufacturing a heat storage ball according to the present disclosure includes steps of:

1) performing linear cutting to a stainless steel ball for heat storage to divide the heat storage ball into two portions:

a ball cover and a semi-spherical body, wherein a volume of the ball cover as cut is 5% of an internal hollow volume of the heat storage ball;

2) packing the heat storage ball with a phase-change material, and then placing the heat storage ball into a Muffle furnace to heat so as to melt the phase-change material;

3) repeating step 2), wherein the packing is done in three times: for the first time, 40% of the internal hollow volume of the heat storage ball is packed; for the second time, 25% of the internal hollow volume of the heat storage ball is packed; and for the third time, 10% of the internal hollow volume of the heat storage ball is packed;

4) welding the ball cover onto the semi-spherical body using a welding encapsulating process to seal the phase-change material.

In the step 2), a heating temperature is 20° C. above a melting point temperature of the phase-change material, and after a temperature in the Muffle furnace reaches a highest heating temperature of the heat storage ball, the temperature is maintained constant for 20 minutes.

Compared with the prior art, the present disclosure has the following advantages:

(1) The present disclosure comprehensively weighs two important indicators for evaluating the performance of a heat storage apparatus: heat storage rate and heat storage density; with the heat storage rate density as an optimized parameter, an optimal combination of diameters of the heat storage balls may be designed to comprehensively improve the overall heat storage performance of the heat storage apparatus.

(2) During a specific use process, the present disclosure may offer references to choose diameters of the heat storage balls inside the heat storage apparatus so as to design heat storage apparatuses of different structures according to design needs. For example, to obtain a relatively high heat storage rate, heat storage balls with a relatively small ball diameter may be chosen for the heat storage apparatus; and to obtain a relatively high heat storage density, heat storage balls with a relatively large diameter may be used.

(3) The method of manufacturing a heat storage ball according to the present disclosure may not only be adapted to low-temperature organic phase-change materials and inorganic salt phase-change materials, but also may be adopted to high-temperature molten salt phase-change materials.

(4) The heat storage ball manufactured according to the present disclosure has characteristics such as a high heat storage capacity, a high heat conductivity, a high mechanical strength, high-temperature endurance, corrosion-resistance, a good performance of sealing the phase-change material, and a low cost.

Throughout the drawings, 1 represents a cylindrical heat storage tank; 2 represents a top conical heat storage tank; 3 represents a bottom conical heat storage tank; 4 represents a top fluid inlet channel; 5 represents a bottom fluid outlet channel; 6 represents a top connecting flange; 7 represents a bottom connecting flange; 8 represents a top flow equalization distributor; 9 represents a bottom flow equalization distributor; 10 represents a large-diameter heat storage ball; 11 represents a small-diameter heat storage ball; 12 represents a supporting frame.

DETAILED DESCRIPTION OF EMBODIMENTS

Hereinafter, the present disclosure will be further illustrated with reference to the accompanying drawings and the preferred embodiments.

Figure 1:
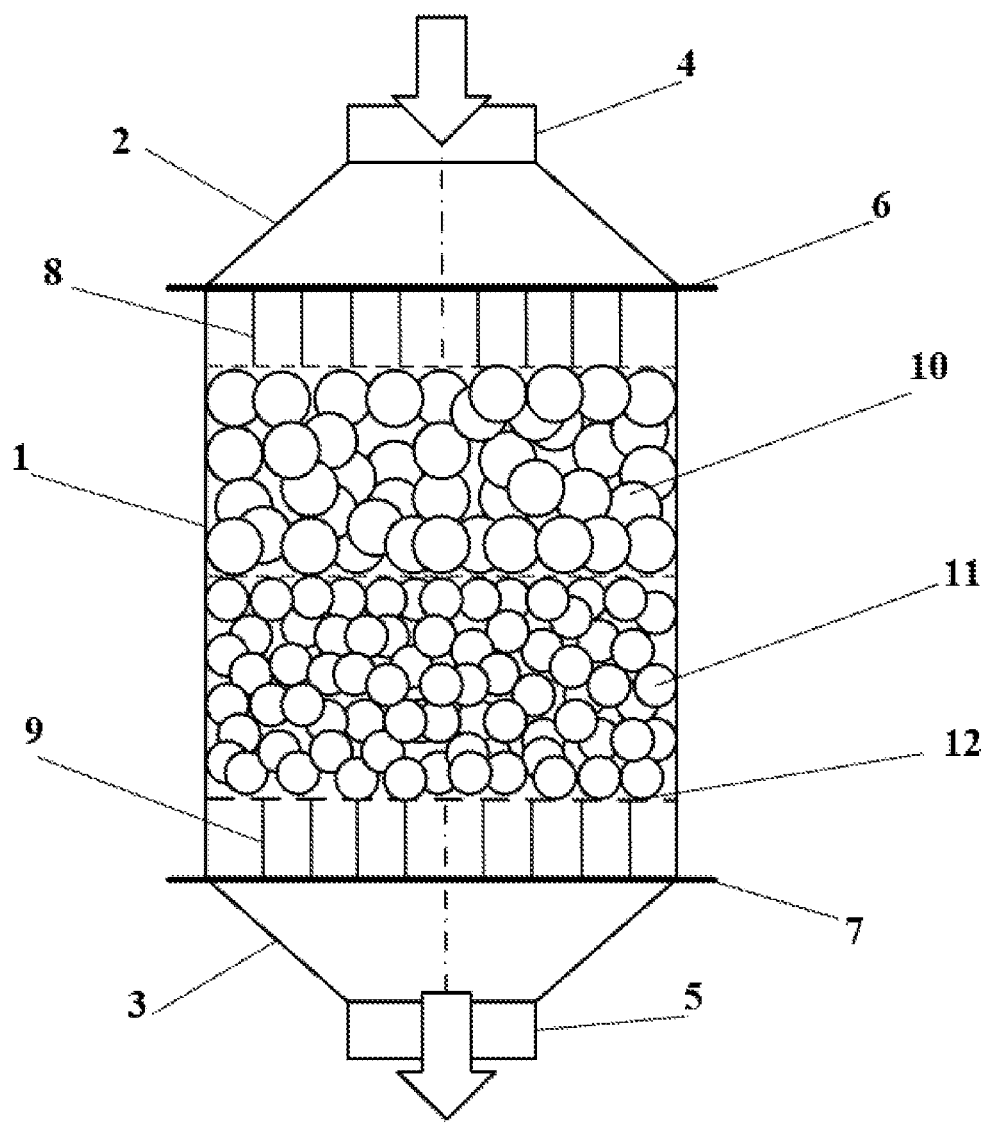
FIG. 1 shows a structural schematic diagram of a two-layered varied ball diameter packed bed heat storage apparatus.

Please refer to FIG. 1, a packed bed heat storage apparatus according to the present disclosure includes a packed bed heat storage tank, heat storage balls, a fluid inlet channel, and a fluid outlet channel; the packed bed heat storage tank includes a cylindrical heat storage tank 1, a top conical heat storage tank 2, and a bottom conical heat storage tank 3; an upper portion of the cylindrical heat storage tank is mounted with an upper connecting flange 6, and a lower portion of the cylindrical heat storage tank is mounted with a lower connecting flange 7, wherein the top conical heat storage tank and the bottom conical heat storage tank are connected to the cylindrical heat storage tank via the upper connecting flange and the lower connecting flange, respectively; the top conical heat storage tank is connected to the fluid inlet channel 4, and the bottom conical heat storage tank is connected to the fluid outlet channel 5; the fluid inlet channel is an inlet channel for fluid during a heat storage process; the fluid outlet channel is an outlet channel for fluid during the heat storage process; a flow equalization distributor 8, 9 is mounted at both of the top portion and the bottom portion of the cylindrical heat storage tank, a supporting frame 12 that can be metal for supporting the heat storage balls is mounted at the bottom portion of the cylindrical heat storage tank; the heat storage balls are piled up inside the cylindrical heat storage tank to form a packed bed, where interstices in the packed bed act as a heat transfer flow channel; the heat storage balls include large-diameter heat storage balls 10 at an upper layer of the cylindrical heat storage tank and small-diameter heat storage balls 11 at a lower layer of the cylindrical heat storage tank.

A heat storage process of the two-layered varied ball diameter packed bed heat storage apparatus according to the present disclosure is provided below: a high-temperature heat transfer active medium with a temperature of $T_{in}$ flows in from an upper flow channel, through a flow equalization distributor into a packed bed area. Within the packed bed area, the high-temperature active medium heats the heat storage balls, passes the heat energy to the heat storage balls so as to be stored by means of apparent heat and latent heat; the cooled low-temperature active medium flows out from a lower flow channel. After the heat storage process ends, the heat storage apparatus will be filled with the heat transfer active medium with the temperature of $T_{in}$ and the heat storage balls.

The two-layered varied ball diameter packed bed heat storage apparatus according to the present disclosure is layered following such a principle: as shown from the analysis of the heat storage process, the temperature of the packed bed heat storage apparatus gradually decreases due to constant heat exchange between the heat exchange fluid and the phase-change material along the flow direction. As far as the entire heat storage apparatus is concerned, the heat exchange fluid has a high temperature at an inlet segment, resulting in a large heat exchange temperature difference and thus a good heat exchange effect; while at an outlet segment, the heat exchange fluid has a low temperature, resulting in a narrow heat exchange temperature difference and a deteriorated heat exchange effect. To address this issue, by arranging heat storage balls with a larger diameter at the upper layer of the heat storage apparatus, the heat storage apparatus may have a relatively high heat storage density, while by arranging heat storage balls with a smaller diameter at the lower layer of the heat storage apparatus, a heat exchange area may be enlarged, thereby improving the heat storage rate of the heat storage apparatus. From a comprehensive perspective, compared with a single-layered constant diameter heat storage ball apparatus, the two-layered varied ball diameter heat storage apparatus may improve the heat storage rate density of the heat storage apparatus and optimize the heat storage performance.

Diameters of the heat storage balls inside the two-layered varied ball diameter packed bed heat storage apparatus according to the present disclosure may be chosen through numerical value simulation and optimization, a specific process of which is provided below:

1) determining specific dimensional parameters and operating conditions of the heat storage apparatus, including: height $H_{tank}$ of the heat storage apparatus, height $H_{bed}$ of the packed bed, diameter D of the heat storage apparatus, optional diameter $d_p$ of a heat storage ball, inlet temperature $T_{in}$ of the heat storage process, and inlet mass flow $U_{in}$ of the heat storage process.

2) building a heat transfer model of a heat storage apparatus having a combination of two different heat storage ball diameters, and performing simulated computation of the heat storage apparatus model with the combination of different heat storage balls.

3) obtaining a heat storage duration $\tau$ and a heat storage amount $Q_{stored}$ under different scenarios based on the result of numerical value computation, thereby calculating parameters such as a heat storage rate p, a heat storage density q, and a heat storage rate density w, etc.

Particularly, the heat storage amount is defined as:

$$Q_{stored}=m_p[C_{p,s}(T_m-T_{ini})+m_p\Delta H+m_p C_{p,l}(T_{in}-T_m)]+m_{shell}C_{p,shell}(T_{in}-T_{ini}) \quad (1)$$

the heat storage rate is defined as:

$$p = \frac{Q_{stored}}{\tau} \quad (2)$$

the heat storage density is defined as:

$$q = \frac{Q_{stored}}{m_{EPCM}} = \frac{Q_{stored}}{m_p + m_{shell}} \quad (3)$$

the heat storage rate density is defined as:

$$w = \frac{Q_{stored}}{\tau \cdot m_{EPCM}} = \frac{Q_{stored}}{\tau \cdot (m_p + m_{shell})} \quad (4)$$

where, $Q_{stored}$ denotes a heat storage amount, J; w denotes the heat storage rate density, W·kg-1; $\tau$ denotes a heat storage duration, s; $m_p$ denotes a total mass of the phase change material, kg; $m_{EPCM}$ denotes the total mass of the heat storage balls, kg, including the mass $m_p$ of the phase change material and the mass $m_{shell}$ of the stainless ball shell; $C_{p,s}$ denotes a solid-state specific heat capacity of the phase-change material, J kg$^{-1}$K$^{-1}$; $C_{p,l}$ denotes a liquid-state specific heat capacity of the phase-change material, J kg$^{-1}$K$^{-1}$; $C_{p,shell}$ is a specific heat capacity of stainless steel, J kg$^{-1}$K$^{-1}$; $\Delta H$ denotes latent heat of the phase-shift material, kJ kg$^{-1}$; $T_m$ denotes a melting point of the phase-change material, K; $T_{in}$ denotes the temperature at the inlet of the heat storage, K; $T_{ini}$ denotes the initial temperature of the heat storage, K.

4) comparing the heat storage rate densities under different combinations of heat storage ball diameters to obtain a combination of heat storage ball diameters of the heat reservoir with best heat storage performance.

A process of manufacturing a heat storage ball for the two-layered varied ball diameter packed bed heat storage apparatus mainly includes steps of: (1) performing linear cutting to a stainless steel ball for heat storage to divide the heat storage ball into two portions: a ball cover and a semi-spherical body, wherein a volume of the ball cover as cut is 5% of an internal hollow volume of the heat storage ball, which is the basis for computing a height of the ball cover so as to perform cutting. (2) packing the heat storage ball with an appropriate amount of phase-change material, and then placing the heat storage ball inside a Muffle furnace to heat so as to melt the phase-change material, wherein a heating temperature is 20° C. above a melting point temperature of the phase-change material, and after a temperature in the Muffle furnace reaches a highest heating temperature of the heat storage ball, the temperature is maintained constant for 20 minutes so as to guarantee that the phase-change material inside the heat storage ball is sufficiently melted; then, with natural cooling, the phase-change material forms a dense structure; (3) repeating step 2), wherein the packing is done in three times: for the first time, 40% of the internal hollow volume of the heat storage ball is packed; for the second time, 25% of the internal hollow volume of the heat storage ball is packed; and for the third time, 10% of the internal hollow volume of the heat storage ball is packed; after the packing is completed, the packed volume with the phase-change material inside the heat storage ball is about 75%; (4) sealing the phase-change material using a welding encapsulating process, wherein during the welding process, because the welding temperature is relatively high, which will melt the molten salt, it is recommended not to add too much salt in step (3); in the meanwhile, the high-temperature condition during the welding process facilitates escaping of part of air to thereby reduce the air amount inside the heat storage ball, which reduces the internal pressure of the heat storage ball during the melting process and thus avoids leakage of the phase-change material due to cracking of the heat storage ball under a high-temperature condition.

The heat storage ball manufactured as such has advantages such as a relatively high heat storage density, a high heat conductivity coefficient, a high mechanical strength, a high temperature endurance, corrosion-resistance, a good performance of sealing the phase-change material, a lost cost, and a simple welding process.

Again, diameters of the heat storage balls inside the two-layered varied ball diameter packed bed heat storage apparatus according to the present disclosure may be chosen through numerical value simulation and optimization, a specific process of which is provided below:

1) building a physical model of the two-layered varied ball diameter packed bed heat storage apparatus The two-layered varied ball diameter packed bed heat storage apparatus is a cylindrical heat storage tank, with heat storage balls filled in an internal packed bed thereof, wherein high-temperature air enters from a top portion of the heat storage tank, exchanges heat with the heat storage balls in the heat storage tank, and then flows out; considering a potential heat loss due to the heat storage tank contacting with the external, an outer side of the heat storage tank is made of a heat insulation material.

(2) building a numerical value computation model for flowing heat exchange inside the two-layered varied ball diameter packed bed heat storage apparatus.

With respect to the physical model above, to obtain temperature distribution of the phase-change heat storage balls and the heat exchange fluid inside the packed bed, a concentric axially symmetrical diffusion model is adopted; to simplify the computation, the following reasonable assumptions are made: (1) the heat storage balls are evenly distributed inside the packed ball with a uniform void ratio; the temperature and velocity of the heat exchange fluid is evenly distributed along the flow direction; (2) the temperature change along the radial direction of the heat storage tank is neglected; (3) the heat losses at the inlet and outlet of the heat storage tank are neglected, where it is assumed that only the heat loss caused by heat exchange between the heat exchange fluid and the external through a heat storage tank wall surface is counted; (4) radiation heat exchange is neglected. The control equation, boundary condition, and initial condition of the model are provided below:

2-1) Control Equation
fluid:

$$\varepsilon \rho_f c_{p,f} \frac{\partial T_f}{\partial t} + \varepsilon u_f \rho_f c_{p,f} \frac{\partial T_f}{\partial x} = \varepsilon \lambda_f \frac{\partial^2 T_f}{\partial x^2} + h_f(T_{p,R} - T_f) + h_w(T_w - T_f) \quad (5)$$

solid:

$$\frac{\partial T_p}{\partial t} = \frac{\lambda_p}{\rho_s c_p}\left(\frac{\partial^2 T_p}{\partial r^2} + \frac{2}{r}\frac{\partial T_p}{\partial r}\right) \quad (6)$$

For a phase-change material, phase changes and physical property parameter changes will occur during the heating process; to describe the phase change process, an apparent heat capacity method is adopted, which believes that phase changes occur within a very small temperature interval ($\Delta T_m = T_{m2} - T_{m1}$); within this temperature interval, the phase-change material has a very large specific heat capacity. The physical properties during the three stages of the heating process are provided below:

Solid-State Apparent Heat Stage:

$$c_p c_{p,s}, \lambda = \lambda_s, T_p < T_{m1} \quad (7)$$

Phase-Change Heat Storage Stage:

$$c_p = \frac{c_{p,1} + c_{p,s}}{2} + \frac{\Delta H}{T_{m2} - T_{m1}} = \frac{c_{p,1} + c_{p,s}}{2} + \frac{\Delta H}{\Delta T_m}, \quad (8)$$

$$\lambda_p = \frac{\lambda_s + \lambda_1}{2}, T_{m1} < T_p < T_{m2}$$

Liquid-Phase Apparent Heat Stage:

$$c_p = c_{p,l}, \lambda_p = \lambda_l, T_p > T_{m2} \quad (9)$$

A heat exchange coefficient between the solid and the fluid adopts an empirical correlation equation:

$$h_f = \frac{6(1-\varepsilon)\lambda_p}{d_p^2}\left(2 + 1.1\left(\text{Re}^{0.6}\text{Pr}^{\frac{1}{3}}\right)\right), (15 < \text{Re} < 8500) \quad (10)$$

The heat loss due to the heat storage tank contacting with the environment is defined as the total heat exchange loss coefficient $h_w$, including the convection heat exchange coefficient $h_i$ between the heat exchange fluid inside the tank and the tank wall, heat conduction of the tank wall, and heat conduction of the heat insulation cotton, neglecting the natural convection and radiation loss of the outer wall surface. A correlation equation is adopted to compute the $h_w$:

$$\frac{1}{h_w} = \frac{1}{h_i} + r_{bed}\sum_{j=1}^{2}\frac{1}{\lambda_j}\ln\left(\frac{r_{j+1}}{r_j}\right) \quad (11)$$

where $r_{bed}$ denotes an inner diameter of the heat storage tank, j=1 denotes an inner wall surface of the heat storage tank, j=2 denotes an outer wall surface of the heat storage tank, j=3 denotes a heat insulation cotton outer layer, $h_i$ denotes the heat loss heat exchange coefficient of the inner wall surface, and the natural convection and radiation heat loss of the outer wall surface is neglected, wherein a heat exchange correlation equation is adopted for computing the $h_i$:

$$h_i = \frac{\lambda_f}{d_p}\left(\left(0.203\text{Re}^{\frac{1}{3}}\text{Pr}^{\frac{1}{3}}\right) + \left(0.220\text{Re}^{0.8}\text{Pr}^{0.4}\right)\right) \quad (12)$$

For the packed bed model, the equivalent heat conduction correlation equation of the fluid item is:

$$\lambda_{f,eff} = \lambda_f\left[\frac{1 + 2\beta\phi + (2\beta^3 - 0.1\beta)\phi^2 + \phi^3 0.05\exp(4.5\beta)}{1 - \beta\phi}\right] \quad (13)$$

where, $\phi = 1 - \varepsilon, \beta = (\lambda_p - \lambda_f)/(\lambda_p + 2\lambda_f)$ 2-2) the Boundary Condition and the Initial Condition:
Boundary Condition:
Fluid Phase:

$$T_f = T_{in}, x = 0 \quad (14)$$

$$\frac{\partial T_f}{\partial x} = 0, x = H$$

Solid Phase:

$$\frac{\partial T_p}{\partial t} = 0, r = 0 \quad (15)$$

$$\lambda_p \frac{\partial T_p}{\partial r} = h_p(T_f - T_{p,r=Ro}), r = Ro$$

Initial condition: at the initial time of heat storage, the temperature of the heat storage balls inside the tank is the same as that of the heat transfer active medium, i.e., $T_{ini}$, thereby in a thermal equilibrium state.

In the equations, & denotes a void ratio of the packed bed; the subscripts f and p denote the heat transfer active medium and the heat storage ball, respectively; the subscript eff denotes a valid value; the subscripts l and s denote the solid state and the liquid state; w denotes the wall surface; the feature scales of Re and Pr are the heat storage ball equivalent diameters $d_p$; $\rho$ denotes density, kg·m-3; $c_p$ denotes the specific heat capacity at constant pressure, J kg$^{-1}$ K$^{-1}$; $\lambda$ denotes a heat conduction coefficient, W m$^{-1}$K$^{-1}$; u denotes an active medium superficial velocity, m s$^{-1}$; $h_f$ denotes a volumetric convection heat transfer coefficient between the heat transfer active medium and the heat storage ball, W m$^{-3}$K$^{-1}$; $h_l$ denotes a heat loss heat transfer coefficient of the wall surface, W m$^{-3}$ K$^{-1}$.

As discussed above, specific dimensional parameters and operating conditions of the heat storage apparatus are determined, including: height $H_{tank}$ of the heat storage apparatus, height $H_{bed}$ of the packed bed, diameter D of the heat storage apparatus, optional diameter $d_p$ of heat storage balls, inlet temperature $T_{in}$ of the heat storage process, and inlet mass flow $U_{in}$ of the heat storage process.

In this example, the selected larger diameter of the heat storage balls is $d_{p1}$=40 mm, and optional values for the small diameter $d_{p2}$ are 15 mm, 20 mm, 25 mm, 30 mm, and 35 mm Parameters such as the heat storage rate, heat storage density, and heat storage rate density of the heat storage may be obtained through numerical value computation. The exemplary combination of the diameters of the heat storage balls may be preferably selected as 40-25 from table 1, with the heat storage rate density being 48.5 W·kg$^{-1}$. Too large or too small diameter of the small-diameter heat storage balls may cause the comprehensive heat storage performance to be deteriorated.

TABLE 1

Heat Storage Performance Under Different Combinations Obtained by Numerical Value Computation in Implementation Cases

| Item | Heat Storage Rate (W) | Heat Storage Density (kJ · kg$^{-1}$) | Heat Storage Rate Density (W · kg$^{-1}$) |
|---|---|---|---|
| 40-15 | 1555.8 | 191.0 | 45.0 |
| 40-20 | 1506.9 | 205.5 | 47.2 |
| 40-25 | 1458.0 | 217.2 | 48.5 |
| 40-30 | 1390.8 | 227.0 | 48.4 |
| 40-35 | 1288.5 | 235.2 | 46.5 |
| 40 Single-Layer | 1157.6 | 241.3 | 43.2 |

Figure 2:
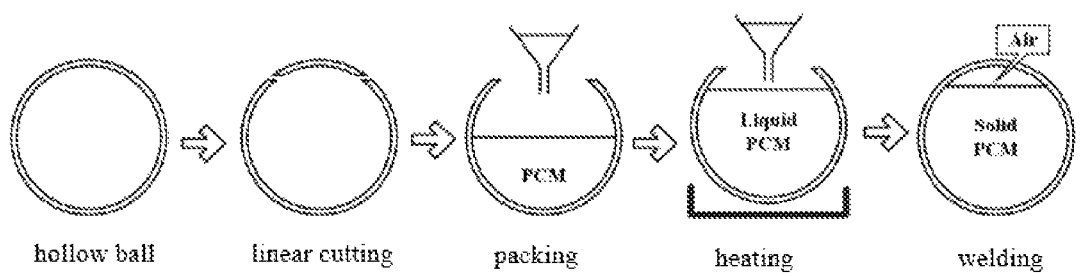
FIG. 2 shows a schematic diagram of a process of manufacturing a heat storage ball.

FIG. 2 shows a process of manufacturing a heat storage ball for the two-layered varied ball diameter packed bed heat storage apparatus, where manufacturing of the heat storage ball will be illustrated with an example of encapsulating the high-temperature molten salt phase-change heat storage material Li$_2$CO$_3$—K$_2$CO$_3$—Na$_2$CO$_3$ (32-35-33 wt %). The melting point of the phase-change material in use is 395.1° C., which is encapsulated with a 304 stainless steel hollow ball, where the outer diameter of the hollow ball is 34 mm, and the inner diameter is 30 mm. The process of manufacturing the heat storage ball mainly includes steps of: 1) performing linear cutting to the stainless steel hollow ball to divide it into two portions: a ball cover and a semi-spherical body, wherein a volume of the ball cover as cut is 5% of an internal hollow volume of the hollow ball; on this basis, the height of the ball cover may be computed to 4 mm; then, cutting is performed. (2) packing the heat storage ball with an appropriate amount of the phase-change material, and then placing the heat storage ball into a Muffle furnace to heat so as to melt the phase-change material, wherein a heating temperature is set to 420° C., 25° C. above the melting point temperature of the phase-change material, and after a temperature in the Muffle furnace reaches a highest heating temperature of the heat storage ball, the temperature is maintained constant for 20 minutes so as to guarantee that the phase-change material inside the heat storage ball is sufficiently melted; then, with natural cooling, the phase-change material forms a dense structure; (3) repeating step 2), wherein the packing is done in three times: for the first time, about 40% of the internal hollow volume of the heat storage ball is packed, i.e., 14 g; for the second time, about 25% of the internal hollow volume of the heat storage ball is packed, i.e., 7 g; and for the third time, about 10% of the internal hollow volume of the heat storage ball is packed, i.e., 5.3 g; after the packing is completed, the packed volume with the phase-change material inside the heat storage ball is about 75%; (4) sealing the phase-change material using a welding encapsulating process. During the welding process, because the welding temperature is relatively high, which will melt the molten salt, it is recommended not to add too much salt in step (3); meanwhile, the high-temperature condition during the welding process facilitates escaping of part of air to thereby reduce the air amount inside the heat storage ball, which reduces the internal pressure of the heat storage ball during the melting process and thus avoids leakage of the phase-change material due to cracking of the heat storage ball under a high-temperature condition. Certain space is reserved inside the manufactured heat storage ball to adapt a thermal stress generated against the heat storage ball surface due to volumetric expansion during the melting process of the phase change material.

What is claimed is:

1. A packed bed heat storage apparatus, comprising:
   a heat storage tank, the heat storage tank having a fluid inlet channel disposed at a first end of the heat storage tank and a fluid outlet channel (5) disposed at a second end thereof, wherein the first end is on top of the second end;
   two layers of heat storage balls with different diameters provided inside the heat storage tank and disposed at a position of the packed bed, wherein the diameters of the heat storage balls at the first layer is larger than these of the heat storage balls at the lower layer and the heat storage balls at the first layer are disposed on top of the heat storage balls at the second layer; and
   a first flow equalization distributor (8) in communication with the fluid inlet channel (4) and disposed under the fluid inlet channel to equalize inlet flow and a second flow equalization distributor (9) in communication with the fluid outlet channel (5) and disposed under the fluid outlet channel to equalize outlet flow, which are provided external to the two layers of heat storage balls, wherein
   the heat storage tank further comprises a cylindrical heat storage tank (1), and a first conical heat storage tank (2) mounted at an upper end of the cylindrical heat storage tank (1) and a second conical heat storage tank (3) mounted at a lower end of the cylindrical heat storage tank (1);
   an upper portion of the cylindrical heat storage tank (1) is mounted with a first connecting flange (6), and a lower portion of the cylindrical heat storage tank is mounted with a second connecting flange (7), wherein the first connecting flange (6), is located above the second connecting flange (7);

the first conical heat storage tank and the second conical heat storage tank are connected to the cylindrical heat storage tank via the first connecting flange (6) and the second connecting flange (7), respectively, wherein the fluid inlet channel (4) is opened at the first conical heat storage tank (2), and the fluid outlet channel (5) is opened at the second conical heat storage tank (3);

wherein the first conical heat storage tank (2), the first connecting flange (6), the first flow equalization distributor (8), the cylindrical heat storage tank, the second flow equalization distributor (9), the second connecting flange (7), and the second conical heat storage tank are directly connected to each other in sequence, wherein the fluid inlet channel is located above the fluid outlet channel; and a fluid flows from the fluid inlet channel, through the first conical heat storage tank (2), the first connecting flange (6), the first flow equalization distributor (8), the cylindrical heat storage tank, the second flow equalization distributor (9), the second connecting flange (7), and the second conical heat storage tank to the outlet flow channel;

wherein the heat storage balls are prepared with the following steps:

1) performing linear cutting to a stainless steel ball for heat storage to divide a heat storage ball of the heat storage balls into two portions: a ball cover and a semi-spherical body, wherein a volume of the ball cover as cut is 5% of an internal hollow volume of the heat storage ball;

2) packing the heat storage ball with a phase-change material, and then placing the heat storage ball into a Muffle furnace to heat so as to melt the phase-change material; and wherein during the step 2), a heating temperature is 20° C. above a melting point temperature of the phase-change material, and after a temperature in the Muffle furnace reaches a heating temperature of the heat storage ball to ensure that the phase-change is melt completely, the heating temperature is maintained constant for 20 minutes 3) repeating step 2), wherein the packing is done in three times: for the first time, 40% of the internal hollow volume of the heat storage ball is packed; for the second time, 25% of the internal hollow volume of the heat storage ball is packed; and for the third time, 10% of the internal hollow volume of the heat storage ball is packed; 4) welding the ball cover onto the semi-spherical body using a welding encapsulating process to seal the phase-change material.

2. The packed bed heat storage apparatus according to claim 1, wherein a metal support (12) supporting the heat storage balls is provided at an interface between the cylindrical heat storage tank (1) and the second conical heat storage tank (3).

3. The packed bed heat storage apparatus according to claim 2, wherein the heat storage tank and the heat storage balls are made of a stainless steel, the heat storage balls being packed with an organic phase-change material, an organic salt or a molten salt phase-change material.

\* \* \* \* \*